United States Patent
Poitras

[11] Patent Number: 5,829,605
[45] Date of Patent: Nov. 3, 1998

[54] MOBILE CRANE TOWABLE BY A PICKUP TRUCK

[76] Inventor: Hermel G. Poitras, 1127 Chemin Old Route 2, St. Leonard-Parent, New Brunswick, Canada, E7E 2N4

[21] Appl. No.: 889,384

[22] Filed: Jul. 8, 1997

[51] Int. Cl.⁶ ................................................ B66C 23/44
[52] U.S. Cl. ........................ 212/180; 280/404; 212/231; 212/299
[58] Field of Search .................... 280/404, 901; 212/294, 299, 300, 230, 231, 238, 261, 225, 227, 228, 257, 180

[56] References Cited

U.S. PATENT DOCUMENTS

| | | | |
|---|---|---|---|
| Re. 30,021 | 6/1979 | Olson et al. | 212/231 |
| 3,034,660 | 5/1962 | Rau . | |
| 3,430,987 | 3/1969 | Whitmire et al. | 280/404 |
| 3,599,812 | 8/1971 | Hasstedt . | |
| 3,760,953 | 9/1973 | Cibin . | |
| 4,036,508 | 7/1977 | Eddy et al. | 280/404 |
| 4,660,731 | 4/1987 | Becker | 212/294 |
| 4,693,384 | 9/1987 | Gilmore | 212/238 |
| 5,082,127 | 1/1992 | Huang . | |
| 5,217,344 | 6/1993 | Gendrault et al. | 280/404 |
| 5,480,041 | 1/1996 | Turner . | |
| 5,490,755 | 2/1996 | Billotte . | |
| 5,513,869 | 5/1996 | Putnam | 280/901 |

FOREIGN PATENT DOCUMENTS

| | | | |
|---|---|---|---|
| 1119466 | 6/1956 | France | 212/300 |
| 1352261 | 7/1964 | France | 212/300 |
| 1543312 | 10/1968 | France | 212/299 |
| 1091304 | 10/1960 | Germany | 212/300 |
| 598460 | 10/1959 | Italy | 280/404 |

*Primary Examiner*—Thomas J. Brahan
*Attorney, Agent, or Firm*—Mario D. Theriault

[57] ABSTRACT

In the present invention, there is provided a mobile crane for hoisting movable articles and for being towed to and from an article hoisting site behind a pickup truck having a hitch attachment. The mobile crane comprises a frame having a front end, a rear end, a pair of front wheels and a pair of rear wheels. The mobile crane also has a mast extending vertically from the frame and a boom support bracket affixed to the mast. A telescopic boom having a far end and a near end is movably cantilevered in the boom support bracket. A tow bar is removably connected to the far end of the boom. The tow bar has a hook-up member mounted thereon and is connectable to the hitch attachment of the pickup truck. A double-acting hydraulic cylinder is connected between the boom support bracket and the boom for raising the front wheels off the ground when the hook-up member is connected to the hitch attachment. The frame has lug plates affixed to the front end thereof for optionally retaining rigging between the boom and the frame. Thus, when the hook-up member is connected to the hitch attachment and when the front wheels are lifted off the ground, the front end of the frame is securable in the raised position to the boom of the crane, whereby the mobile crane is safely towed behind the pickup truck.

20 Claims, 7 Drawing Sheets

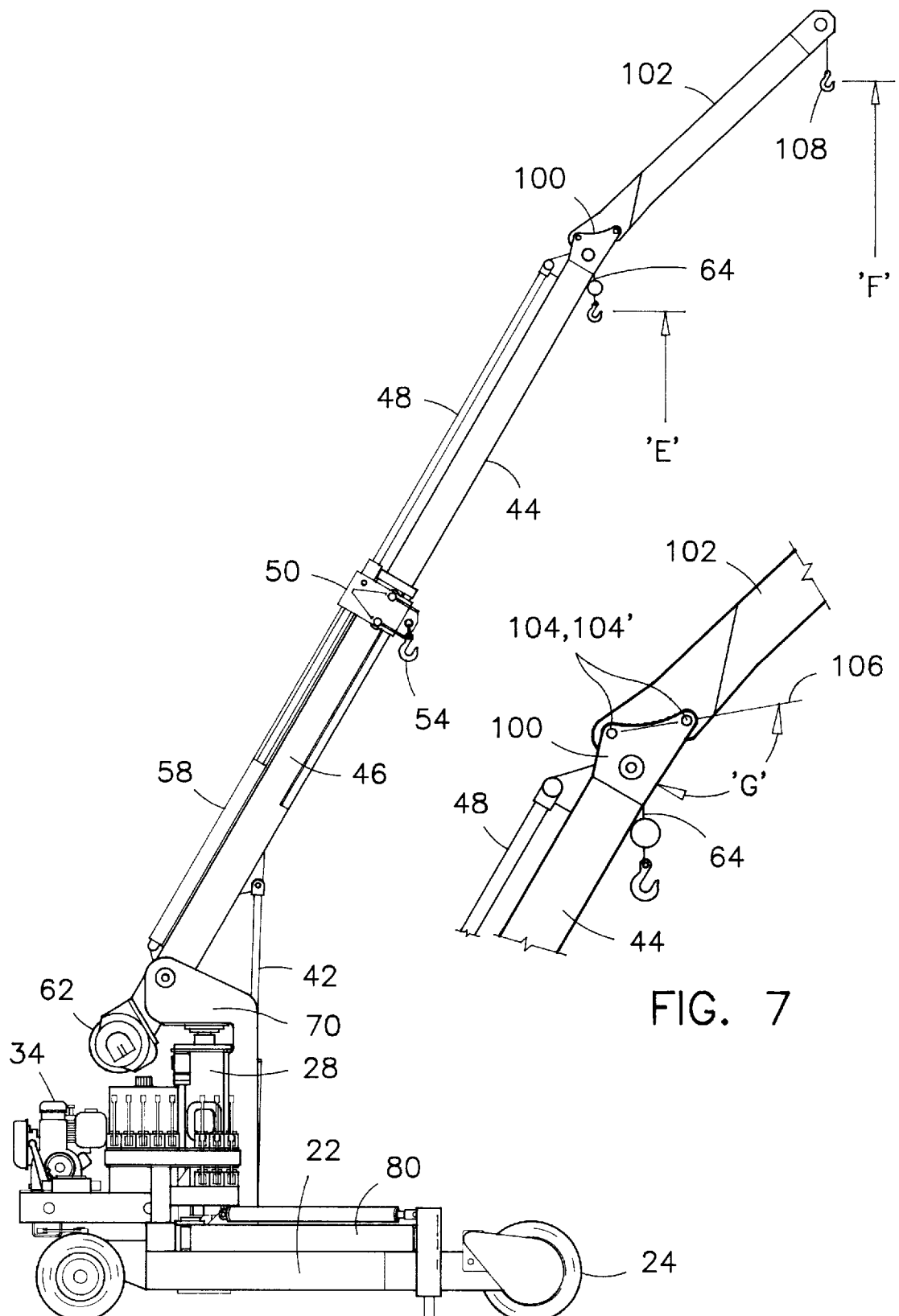

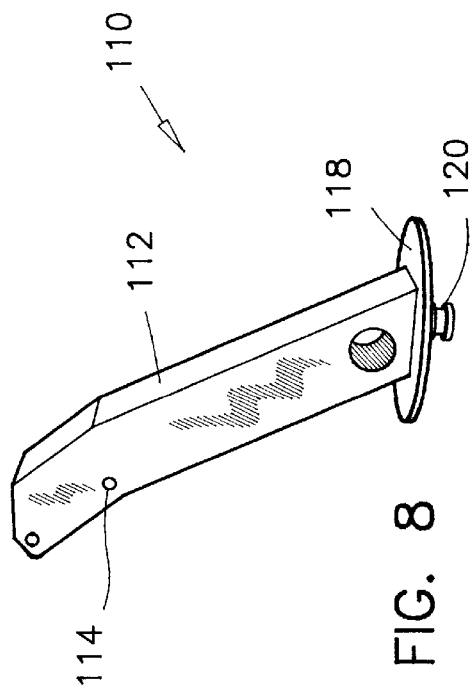
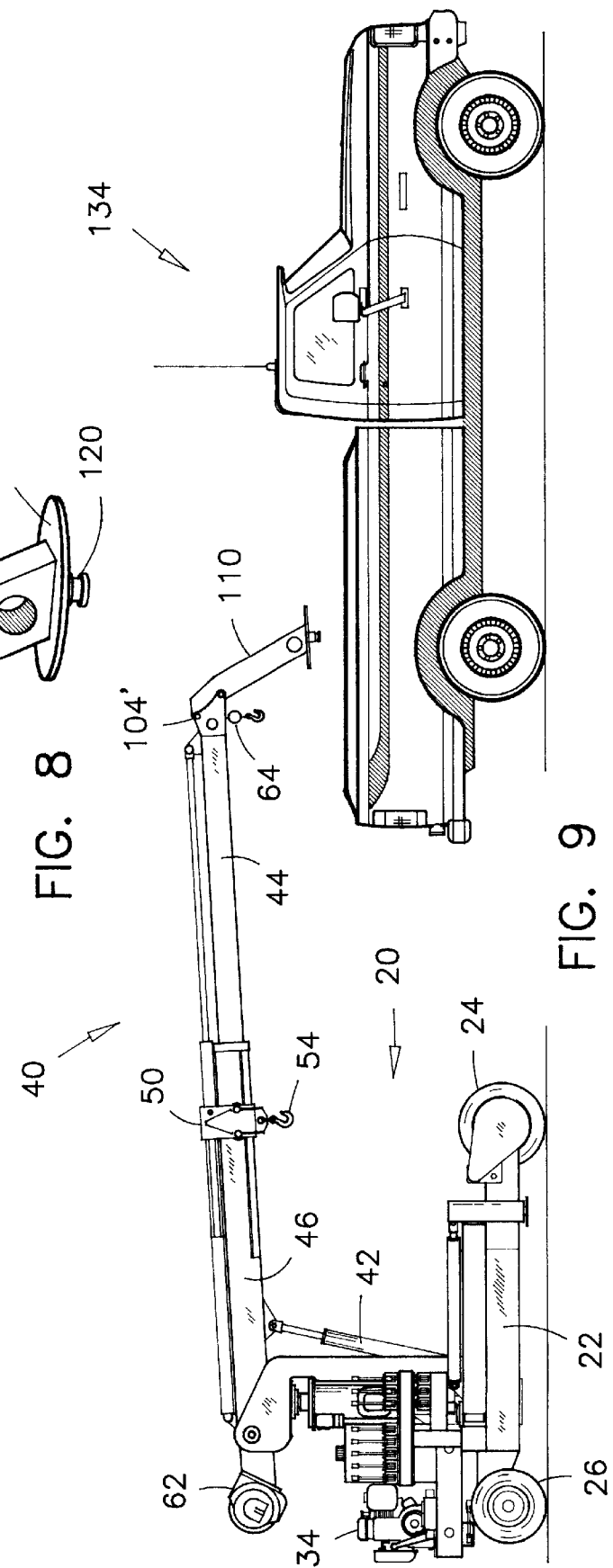

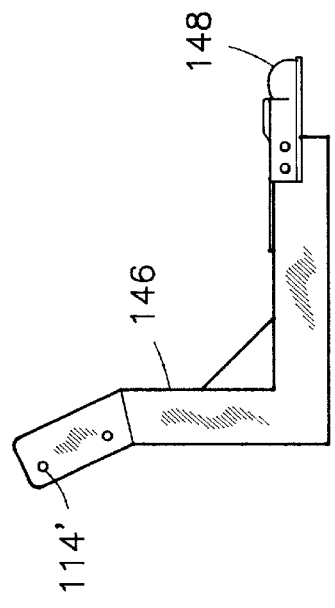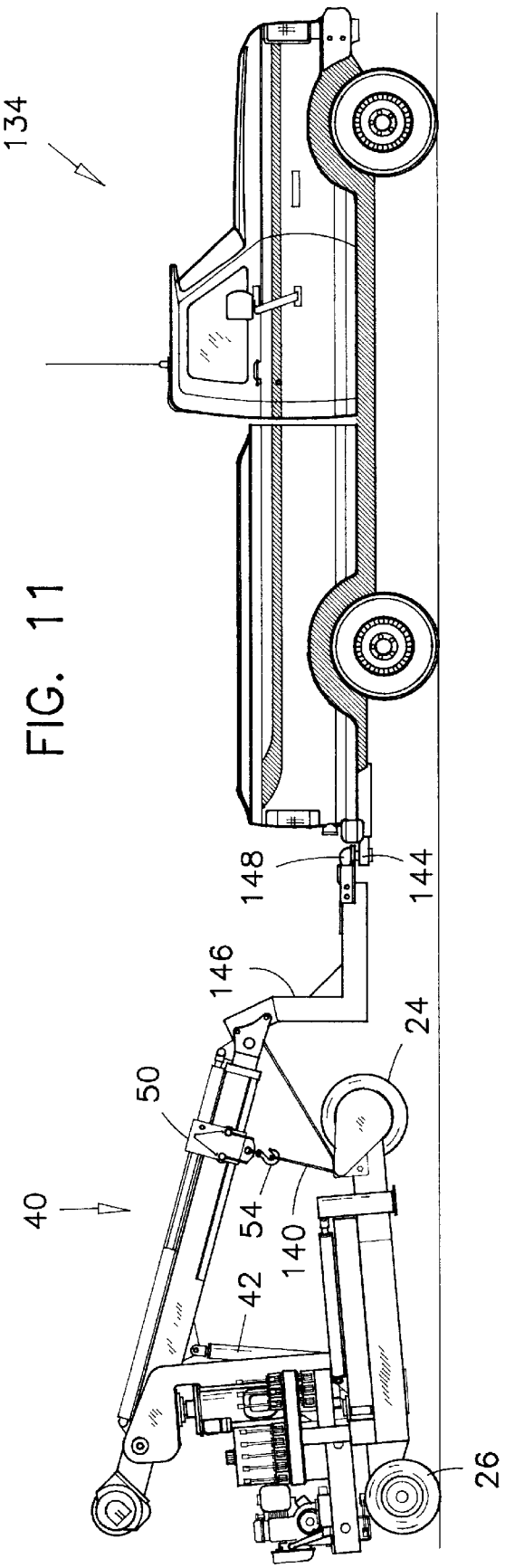
FIG. 11
FIG. 12

MOBILE CRANE TOWABLE BY A PICKUP TRUCK

FIELD OF THE INVENTION

The present invention relates to a mobile crane which is towable by a pickup truck and more particularly, the present invention relates to a mobile crane having a telescopic boom and a tow bar which is attachable to the end of the boom, for connecting the mobile crane to the pickup truck.

BACKGROUND OF THE INVENTION

Mobile cranes are used generally in mills, in equipment repair shops and at construction sites, for hoisting and handling articles which may otherwise be immovable. Hoisting jobs, however, are often performed relatively quickly and the crane must be moved to other work sites in an efficient manner.

Although the operation of a high-reaching crane is usually limited to qualified operators, a number of small mobile cranes are safety-designed for use by house builders, millwrights and building equipment maintenance workers. These small cranes are often available on a daily basis from equipment rental companies for example. Small mobile cranes of this type are often movable behind a pickup truck.

Mobile cranes are known in the art. A first example of a towable crane of the prior art is described in the U.S. Pat. No. 3,599,812 issued on Aug. 17, 1971 to Roger D. Hasstedt et al. The mobile crane described therein has a first hook-up socket mounted on the extremity of the standard of the crane and a second hook-up socket being removably connectable to both lower arms of the crane. Both hook-up sockets are attachable to the hitch ball on the rear bumper of a pickup truck.

A second example of a mobile crane of the prior art is disclosed in U.S. Pat. No. 3,760,953 issued on Sep. 25, 1973 to Egidio Cibin. The self-erecting crane described therein has four wheels and a tow bar attachable to a front member of the crane for towing the crane behind a vehicle.

Similarly, U.S. Pat. No. 3,034,660 issued on May 15, 1962 to Edward A. Rau et al., and U.S. Pat. No. 5,480,041 issued on Jan. 2, 1996 to Eugene M. Turner describe cranes mounted on trailers movable behind a vehicle.

In a further example, the U.S. Pat. No. 5,490,755 issued on Feb. 13, 1996 to Keith W. Billotte, describes a self-propelled log loader carrier having a frame with a hitch pin connectable to the fifth wheel attachment of a tow vehicle.

A common drawback of the mobile cranes of the prior art, however, is that jacks or other lifting means must be used for connecting the tow bar or the hitch pin of the crane to the drawbar of a vehicle. This is particularly inconvenient when the crane is relatively heavy and assistance personnel or jacks having the proper capacity and configuration are not readily available at the work site. Therefore, it can be appreciated that a need exists for a small mobile crane having an hydraulic power supply unit, a tow bar and hydraulic actuators for connecting the tow bar to the hitch attachment of a vehicle using the hydraulic power of the crane.

SUMMARY OF THE INVENTION

In the present invention, however, there is provided a mobile crane for hoisting movable articles and for being towed to and from an article hoisting site behind a pickup truck having a hitch attachment.

In a first aspect of the present invention, the mobile crane comprises a horizontally disposed frame having a front end and a rear end, a pair of first wheels affixed to the front end for supporting the front end, and a pair of second wheels affixed to the rear end for similarly supporting the rear end. The mobile crane also has a mast extending vertically from the frame. The mast has a boom support bracket affixed thereto and the boom support bracket has a first pivot having a horizontal axis of rotation. A boom having a far end and a near end is cantilevered in the boom support bracket with the near end thereof being movably connected to the horizontal pivot of the support bracket. A tow bar is removably connected to the far end of the boom. The tow bar has a hook-up member mounted thereon, which is connectable to the hitch member of the pickup truck.

A double-acting first hydraulic cylinder is connected between the boom support bracket and the boom for forcefully raising and lowering the far end of the boom. An hydraulic power supply system is mounted on the frame for supplying hydraulic power to the first hydraulic cylinder. A first hydraulic valve is connected to the hydraulic power supply system and to the first hydraulic cylinder for controlling a displacement of the first hydraulic cylinder.

A first advantage of the mobile crane of the present invention is that the first hydraulic cylinder is operable for moving the hook-up member into an engagement with the hitch member on the pickup truck, and when the the hook-up member is engaged with the hitch member of the pickup truck, the first hydraulic cylinder is also operable for raising the first wheels off the ground during the towing of the mobile crane.

In another aspect of the mobile crane of the present invention, the frame has lug plates affixed to the front end thereof for optionally retaining rigging between the boom and the frame. Thus, when the first wheels are lifted off the ground, the front end of the frame is attachable in the raised position to the boom of the crane. Hydraulic pressure on the first hydraulic cylinder can therefore be released during the towing of the mobile crane.

In a further aspect of the present invention, the boom comprises a tubular base portion on the near end thereof and an extensional portion being telescopically mounted in the tubular base portion. The extensional portion being extendible relative to the base portion toward the far end of the boom.

A second double-acting hydraulic cylinder is connected between the base portion and the extensional portion for forcefully extending and retracting the extensional portion relative to the base portion. A second hydraulic valve is connected between the hydraulic power supply system and the second hydraulic cylinder for controlling the displacement of the second hydraulic cylinder. When the mobile crane of the present invention is hitched to the pickup truck, the second hydraulic cylinder is operable for positioning the mobile crane at a more or less distant position relative to the pickup tuck.

The mobile crane of the present invention is connectable to the hitch member of the pickup truck and is adjustably positioned behind a pickup truck using its own hydraulic power. The mobile crane of the present invention is thereby particularly appropriate for use by single-man contractors and for lease to homeowners and one-time jobbers by an equipment rental business.

BRIEF DESCRIPTION OF THE DRAWINGS

The preferred embodiment of the present invention will be further understood from the following description, with reference to the drawings in which:

FIG. 6 is a side view of the mobile crane with the mast fully extended and a jib boom mounted thereon;

FIG. 7 is an enlarged view of the coupling plate supporting the jib boom;

FIG. 8 is a perspective side and front view of the tow bar of the first type;

FIG. 9 illustrates the mobile crane of the preferred embodiment being attached to the fifth wheel hitch structure inside the box of a pickup truck;

FIG. 11 illustrates a tow bar of the second type;

FIG. 12 shows the mobile crane of the preferred embodiment having a tow bar of the second type connected to the bumper-type hitch of a pickup truck.

DETAILED DESCRIPTION OF THE PREFERRED EMBODIMENT

Figure 1:
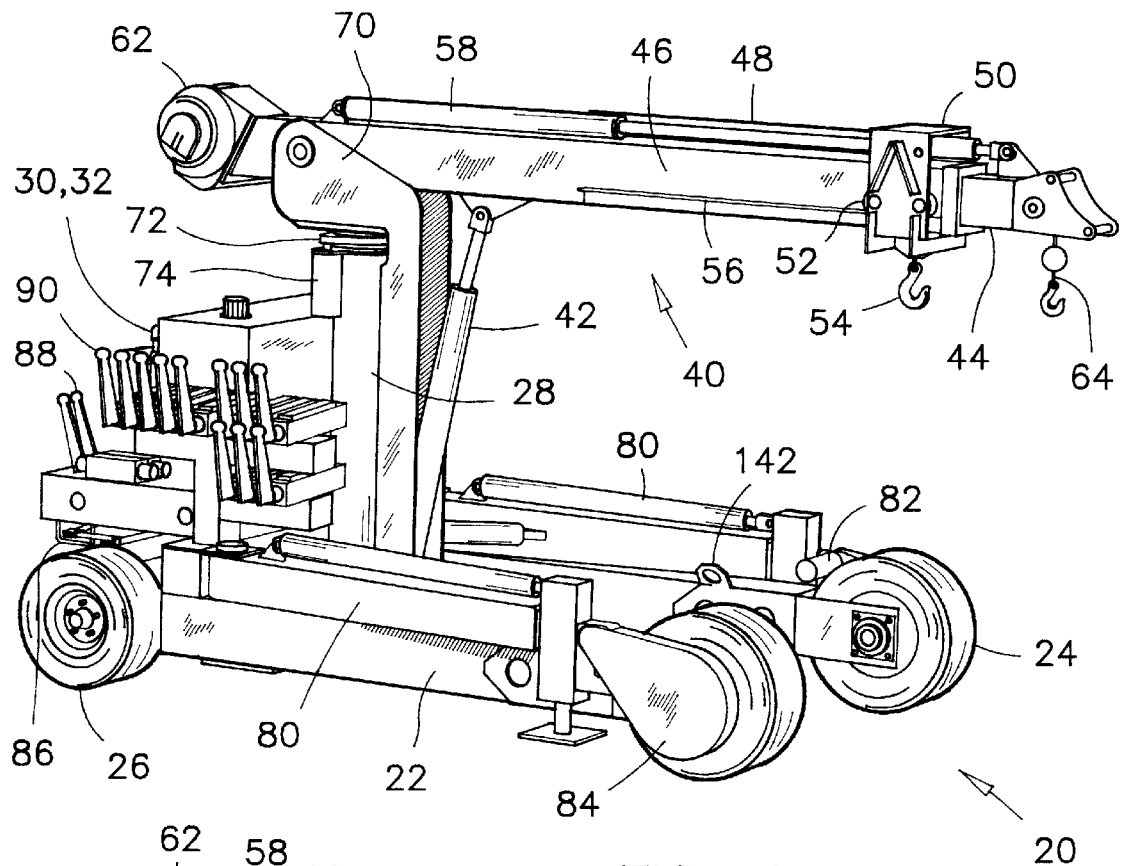
FIG. 1 is a perspective side and front view of the mobile crane of the preferred embodiment.

The mobile crane 20 of the preferred embodiment is illustrated in the accompanying drawings, and in particular in FIGS. 1, and 3–8. The mobile crane 20 of the preferred embodiment has a horizontal U-shaped frame 22 supported above the ground by a pair of front wheels 24 and a pair of rear wheels 26. The front and rear wheels 24, 26 preferably have roadworthy inflated rubber tires mounted thereon.

The rear end of the U-shaped frame 22 supports a mast 28 and an hydraulic power supply unit 30 comprising an hydraulic oil reservoir 32 and a gasoline engine 34 driving an hydraulic pump 36. The mast 28 supports a telescopic boom 40. The boom 40 is pivotally cantilevered on the mast 28 and is actuated in up and down directions by a first hydraulic cylinder 42 hereinafter referred to as the boom-lift hydraulic cylinder 42. The hydraulic power supply unit 30 and the mast 28 are installed on the rear end of the U-shaped frame 22 for keeping the center of gravity of the mobile crane as far as possible from the load end of the boom 40.

The telescopic boom 40 has an extensional portion 44 which is movable in and out the base portion 46 by means of a boom-extend hydraulic cylinder 48 connected to the base portion 46 and the extensional portion 44. A trolley 50 having casters 52 and a first hook 54 is movable on rails 56 along the base portion 46 of the boom by a trolley-actuating hydraulic cylinder 58 which is also connected to the base portion 46 and to the trolley 50. The trolley 50 is particularly advantageous for moving heavy articles from ahead of the front wheels 24 onto a platform 60 between the arms of the U-shaped frame 22. These articles can thereby be transported to other locations by the mobile crane of the preferred embodiment for installation or delivery at the other locations. The mobile crane 20 of the preferred embodiment is therefor usable for lifting loads as well as for trucking these loads about a work site.

An hydraulic winch 62 is mounted on the rear end of the telescopic boom 40. The wire rope 64 wound on the winch 62 is threaded through the telescopic boom 40 and over a pulley (not shown) on the far end of the extensional portion 44.

The mast 28 of the mobile crane of the preferred embodiment comprises a boom support bracket 70 which is pivotally mounted atop the mast 28. A chain and sprocket drive 72 and a first hydraulic motor 74 are connected between the mast 28 and the boom support bracket 70 for selectively swinging the telescopic boom 40 from side to side.

The mobile crane of the preferred embodiment 20 further has a pair of outriggers 80 which are hydraulically movable towards and away from the U-shaped frame 22. The outriggers 80 are also preferably extendible and raisable hydraulically.

The front wheels 24 of the mobile crane 20 are hydraulically driven by a second and third hydraulic motors 82 and 82', and a respective chain and sprocket drive (not shown) under chain guards 84. The rear wheels 26 are preferably steerable by an hydraulic steering cylinder (not shown) and steering linkages 86 which are partly seen in FIGS. 1, 4 and 5. The mobile crane of the preferred embodiment is thereby movable about a construction site for example on its own hydraulic power.

A pair of first hydraulic valves 88 are conveniently located on a rear end on the mobile crane, for controlling the drive motors 82, 82' and the steering system 86 by an operator walking behind the rear end of the mobile crane 20. A second series of hydraulic valves 90 are provided for controlling all the other functions of the crane 20. The second series of valves 90 are mounted near the mast 28 of the crane such that an operator standing near the rear end of the crane has a clear line of sight to all moving parts of the crane, and can thereby safely operate this mobile crane.

Referring now specifically to FIGS. 3–7, there are illustrated therein for reference purposes, the preferred dimensions of the mobile crane 20 of the preferred embodiment. The mobile crane of the preferred embodiment has an overall width 'A' of about 6 feet, a base length 'B' of about 9 feet 6 inches and a shoulder height 'C' of about 79.5 inches. The outriggers 80 are extendible to a span 'D' of about 16 feet. The telescopic boom 40 is extendible to a height 'E' of about 17 feet 6 inches. The extremity of the extensional portion 44 has a pair of coupling plates 100 for optionally retaining a jib boom 102 thereto. The total extendible height 'F' of the telescopic boom 40 of the preferred embodiment with the jib boom 102 installed is about 21 feet 6 inches.

The lifting capacity of the mobile crane of the preferred embodiment 20 is about 3000 lbs. with the boom fully retracted and about 400 lbs. with the boom fully extended and the jib boom installed. The mobile crane 20 is therefore convenient for use inside and around industrial buildings and for hoisting and handling a large variety of articles.

One important aspect of the mobile crane of the preferred embodiment is that the coupling plates 100 are parallel plates, one on each side of the extensional portion 44 of the boom. A pair of holes 104 is provided in each plate 100 for receiving pins 104', for retaining the jib boom 102 to the extensional portion 44.

The alignment of the holes 104 are such that a line 106 along the diameter of both holes 104 makes an obtuse angle G with the longitudinal axis of the extensional portion 44 of the boom. The angle G provides an unobstructed region near the wire rope 64 and rope pulley (not shown) when the jib boom 102 is installed. The presence of the jib boom 102 on the end of the extensional portion 44 does not prevent the use of the hoisting rope 64 suspended from the extensional portion 44. Thus, the boom 40 is optionally usable with a fixed hook 108 attached to the end of the jib boom 102 and with a workable wire rope 62 suspended from the extensional portion 44. It will be appreciated that the jib boom 102 is also usable with the wire rope 64 threaded there through for controlling the hoisting of loads over the entire maximum lifting height 'F'.

The parallel plates 100 and the angle 'G' of the coupling holes 104 are also advantageous for supporting other equipment therewith without hindering the operation of the wire rope 64 suspended at the end of the extensional portion 44. In this respect, it will be appreciated that a tow bar 110 can be connected to the extensional portion 44 of the boom for towing the mobile crane 20 behind a vehicle. A tow bar 110 of a first type is illustrated in FIGS. 2, 8, 9 and 10. The boom-lift cylinder 42 of the mobile crane of the preferred embodiment is preferably a double acting hydraulic cylinder such that a power assisted raising and lowering of the tow bar 110 may be effected by the operator of the mobile crane.

Figure 2:
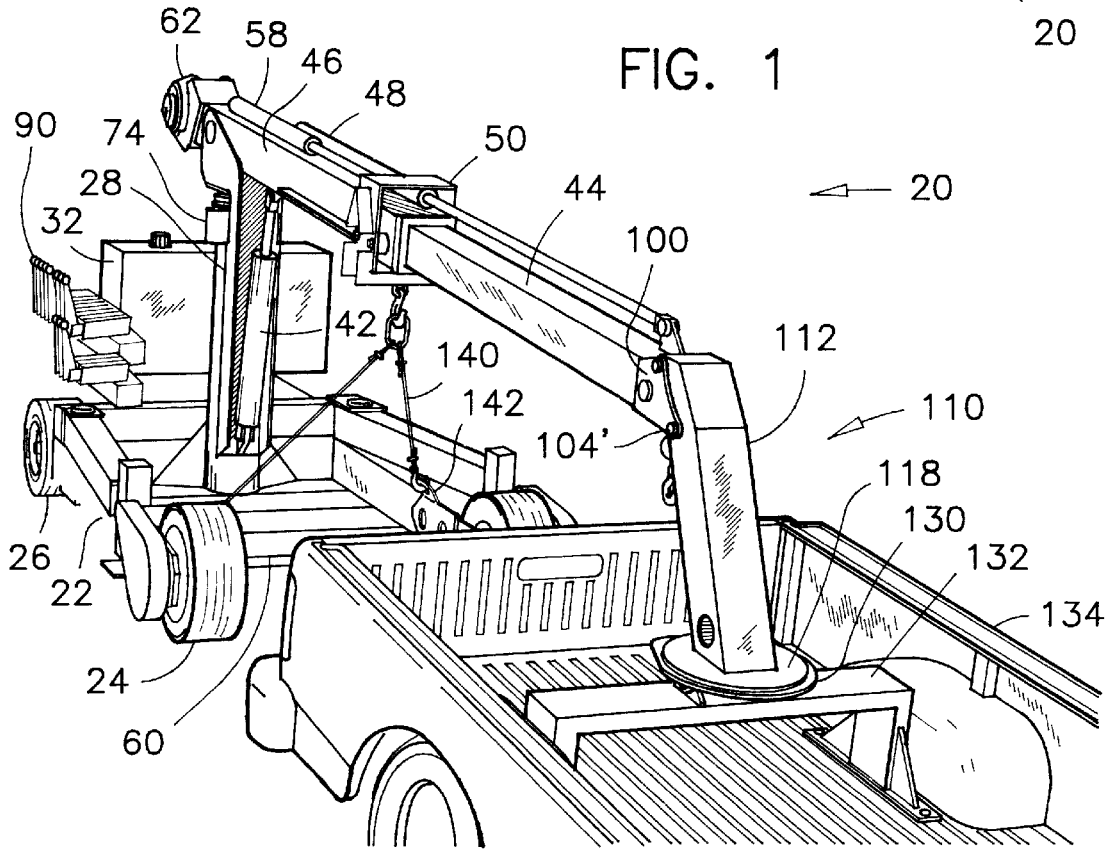
FIG. 2 is a perspective top and front view of the mobile crane of the preferred embodiment having a tow bar of a first type connected to a fifth wheel hitch structure mounted inside the box of a pickup truck.
Figure 3:
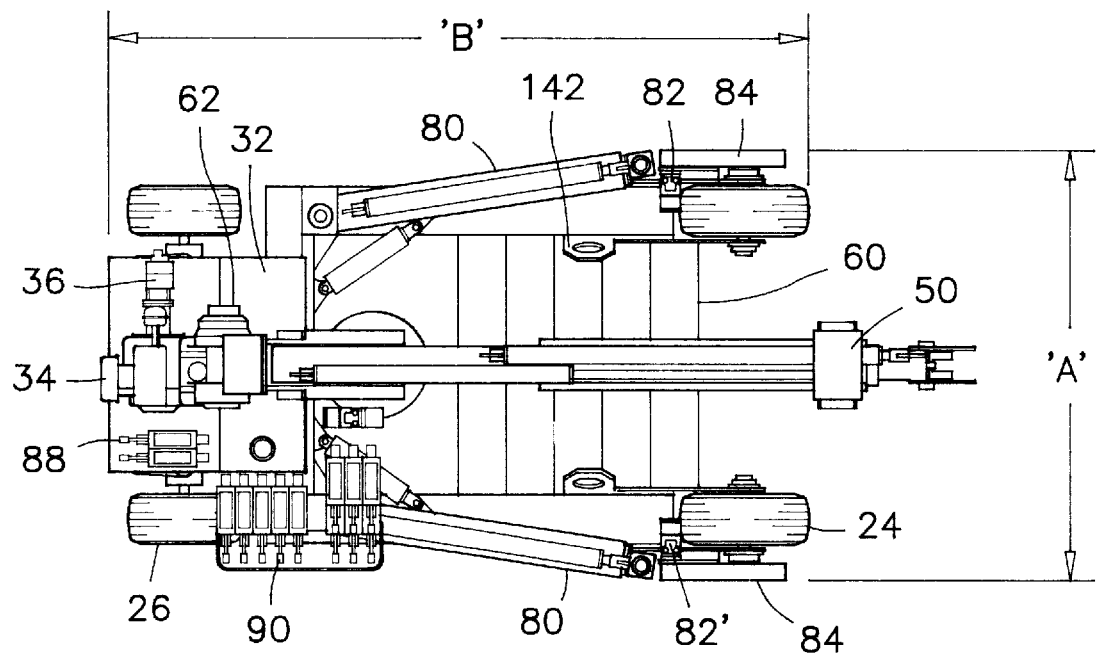
FIG. 3 is a top view of the mobile crane of the preferred embodiment.
Figure 4:
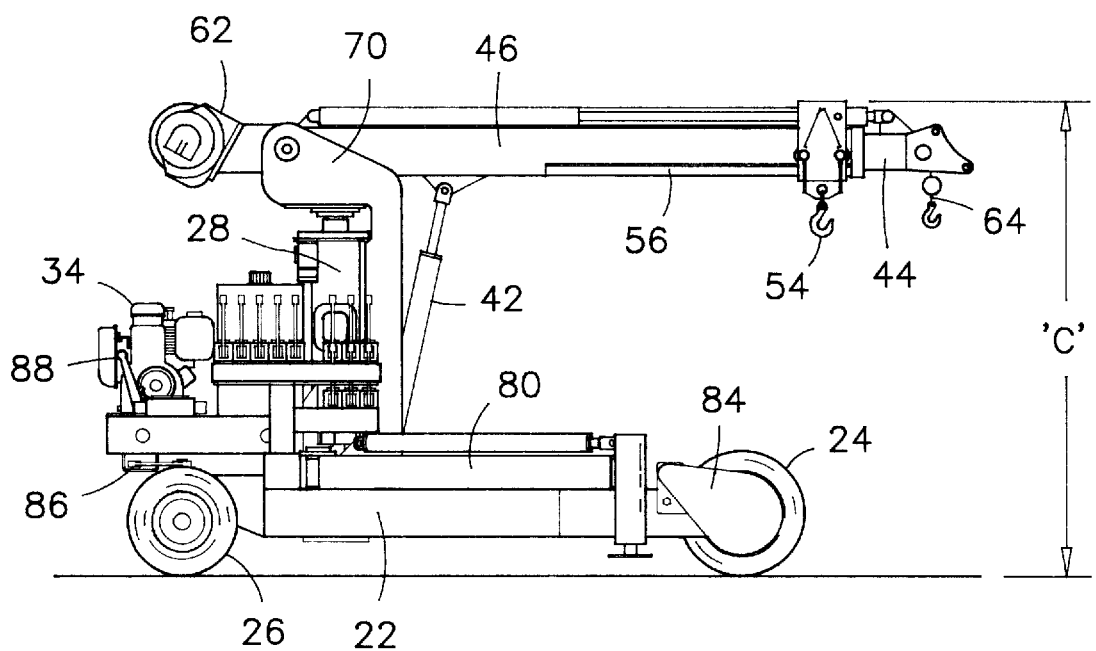
FIG. 4 is a side view of the mobile crane of the preferred embodiment.
Figure 5:
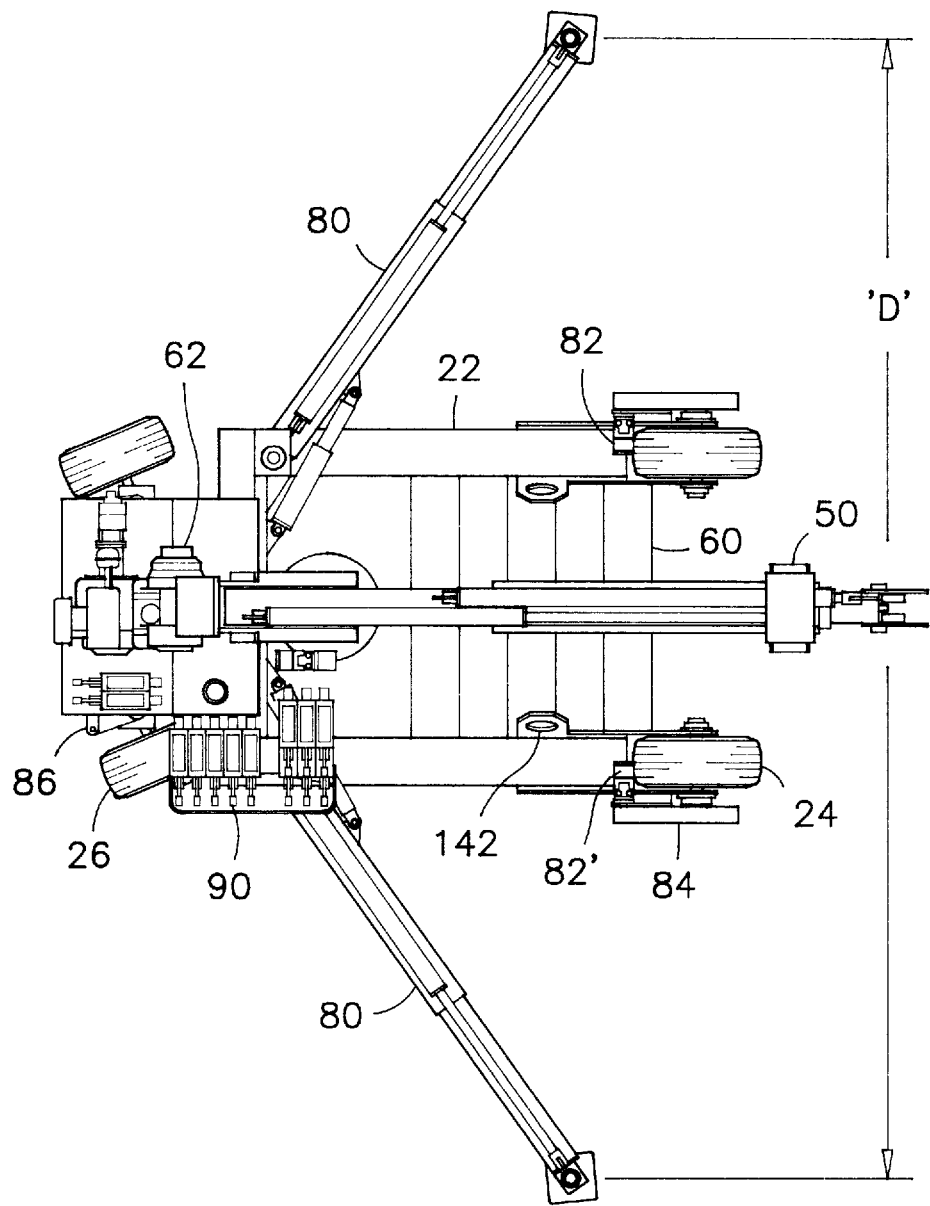
FIG. 5 is a top view of the mobile crane of the preferred embodiment with both outriggers extended.

The tow bar 110 of the first type comprises a tubular member 112 with a pair of openings 114 matching the holes 104 in the parallel plates 100 in size and spacing. A pair of pins 104' are inserted through holes 104 and openings 114 for retaining the tow bar 110 to the end of the extensional portion 44. The tow bar 110 also has on a lower end thereof, a circular plate 118 and a cylindrical hook-up pin 120. The hook-up pin 120 is sized to connect into a fifth wheel attachment 130 of the pickup truck as illustrated in FIG. 2. The fifth wheel attachment 130 is preferably mounted on a tow structure 132 affixed to the bed of the box of the pickup truck 134.

Figure 10:
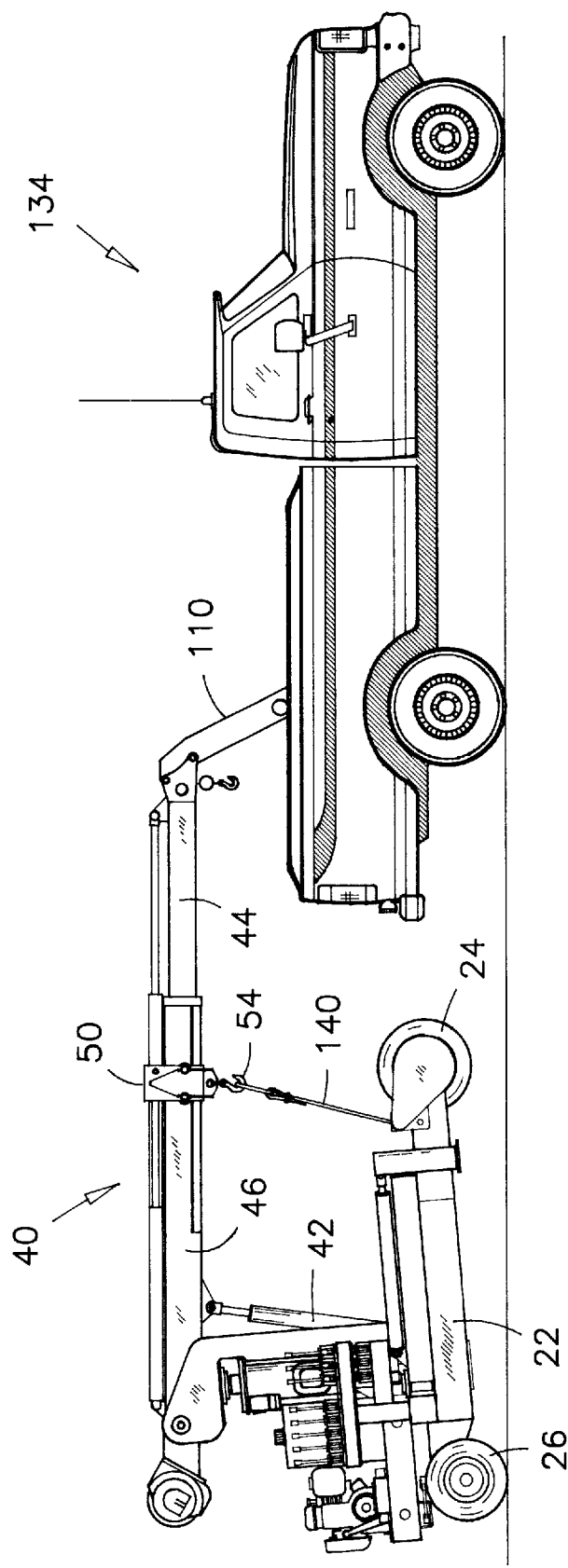
FIG. 10 illustrates the mobile crane of the preferred embodiment having a tow bar of the first type connected to the hitch member of a pickup truck.

Referring now particularly to FIGS. 2, 9 and 10, the connection of the mobile crane of the preferred embodiment to a tow vehicle 134 is effected by positioning the mobile crane behind the tow vehicle; extending the boom 40 and lowering the tow bar 110 in engagement with the fifth wheel hitch 130; raising the front wheels 24 of the crane off the ground by actuating the boom-lift cylinder 42 in a retracting mode, and tying the base portion 46 of the boom 40 to the U-shaped frame 22. A further step may include adjusting the length of the extensional portion 44 to maintain the mobile crane at a preferred distance behind the tow vehicle 134.

The tying of the base portion 46 of the boom to the U-shaped frame 22 is done by installing cable or chain-type rigging 140 between the hook 54 of the trolley 50 and a pair of lug-plates 142 affixed to the arms of the U-shaped frame 22. The rigging 140 maintains the front wheels 24 off the ground and also prevents a rotation of the boom 40 and the boom support bracket 70 relative to the mast 28 and the U-shaped frame 22. The mobile crane of the preferred embodiment is thereby safely towed on a highway for example behind a pickup truck 134.

The mobile crane of the preferred embodiment is easily hitched to a tow vehicle under its own hydraulic power, by the operator of the crane. This characteristic is advantageous when the mobile crane is used by a single-man jobber for example, or is used at a job site where the available personnel is limited.

Although the preferred hitch has been described as a fifth wheel-type hitch 130, the mobile crane may also be towed by a vehicle having a bumper-type ball hitch 144 as illustrated in FIGS. 11 and 12, using a tow bar of a second type 146. The tow bar of the second type 146 has a L-shape member, a set of openings 114' and a socket-type hook-up 148 mounted thereon. The tow bar of the second type 146 is particularly advantageous for towing mobile cranes of equipment rental companies where a larger portion of users of such equipment have pickup trucks with bumper-type hitches.

While the above description provides a full and complete disclosure of the preferred embodiment of this invention, various modifications, alternate constructions and equivalents may be employed without departing from the true spirit and scope of the invention. Such changes might involve alternate components, structural arrangements, construction features or the like. Therefore, the above description and the illustrations should not be construed as limiting the scope of the invention which is defined by the appended claims.

I claim:

1. A mobile crane for hoisting movable articles and for being towed to and from an article hoisting site behind a vehicle having a hitch member, said mobile crane comprising:

a horizontally disposed frame having a front end and a rear end;

a pair of first wheels affixed to said front end for supporting said front end and a pair of second wheels affixed to said rear end for similarly supporting said rear end;

a mast extending vertically from said frame, said mast having a boom support bracket affixed thereto and said boom support bracket having a first pivot having a horizontal axis of rotation;

a tubular boom mounted in said boom support bracket, said boom having a far end, a near end, and a pulley mounted on said far end; said boom being cantilevered in said boom support bracket with said near end being movably connected to said first pivot;

a winch mounted on said near end of said boom with a cable thereof threaded inside said boom and over said pulley;

coupling means affixed to said far end of said boom, said coupling means comprising a pair of spaced-apart parallel plates disposed astride said pulley, and each having a pair of holes there through and a downward alignment of said holes in each said pair of holes, forming an obtuse angle with the longitudinal axis of said boom on said near end of said boom;

a tow bar connected to said pairs of holes in said coupling means, said tow bar having an orientation following said downward alignment; said tow bar having a hook-up member mounted thereon and said hook-up member being connectable to a hitch member of a tow vehicle;

a first hydraulic cylinder connected between said boom support bracket and said boom;

an hydraulic power supply system mounted on said frame for supplying hydraulic power to said first hydraulic cylinder;

a first hydraulic valve connected to said hydraulic power supply system and to said first hydraulic cylinder for controlling a displacement of said first hydraulic cylinder;

such that said first hydraulic cylinder is operable for moving said hook-up member into an engagement with a hitch member of a tow vehicle, and said winch is operable when said tow bar is mounted to said far end of said boom.

2. A mobile crane as claimed in claim 1 wherein said hook-up member comprises a circular plate and a cylindrical pin protruding through said circular plate, said circular plate and said cylindrical pin being sized to mate with a fifth-wheel-type hitch.

3. A mobile crane as claimed in claim 1 wherein said boom comprises a tubular base portion on said near end and an extensional portion being telescopically mounted in said tubular base portion and being extendible toward said far end, and said tow bar being connected to said extensional portion.

4. A mobile crane as claimed in claim 1 wherein said frame is an U-shaped frame having a pair of spaced-apart arms pointing toward said front end and a rear-end member joining said spaced-apart arms along said rear end, and said U-shaped frame comprises a platform mounted between said spaced-apart arms for selectively supporting a movable article.

5. A mobile crane for hoisting movable articles and for being towed to and from an article hoisting site behind a tow vehicle having a hitch member, said mobile crane comprising:
   a horizontally disposed U-shaped frame having a front end, a rear end, a pair of spaced-apart arms pointing toward said front end and a rear-end member joining said spaced-apart arms along said rear end;
   a pair of first wheels affixed to said arms on said front end for supporting said front end and a pair of second wheels affixed to said rear end for similarly supporting said rear end;
   a mast extending vertically from said U-shaped frame, said mast having a boom support bracket affixed thereto and said boom support bracket having a first pivot having a horizontal axis of rotation and a second pivot having a vertical axis of rotation relative to said U-shaped frame;
   a boom mounted in said boom support bracket, said boom having a far end and a near end, said boom being cantilevered in said boom support bracket with said near end being movably connected to said first pivot;
   a tow bar connected to said far end of said boom, said tow bar having a hook-up member mounted thereon, said hook-up member being connectable to a hitch member on a tow vehicle;
   a trolley movably mounted on said boom, and having a hook attached thereto;
   said boom also comprising a trolley hydraulic cylinder connected to said boom and to said trolley for forcefully controlling a displacement of said trolley along said boom;
   said spaced-apart arms each having a lug plate affixed thereto near said front end thereof;
   rigging means connected between said lug plates and said hook for lifting and retaining said spaced-apart arms in a raised position;
   a boom hydraulic cylinder connected between said mast and said boom, said boom hydraulic cylinder being a double-acting hydraulic cylinder for forcefully raising and lowering said far end of said boom about said first pivot relative to said U-shaped frame;
   an hydraulic power supply system mounted on said U-shaped frame for supplying hydraulic power to said boom hydraulic cylinder;
   first and second hydraulic valves connected to said hydraulic power supply system and to said boom hydraulic cylinder for controlling a displacement of said boom hydraulic cylinder and to said trolley hydraulic cylinder for controlling a displacement of said trolley hydraulic cylinder;
   such that said boom hydraulic cylinder is operable for moving said hook-up member into an engagement with a hitch member of a tow vehicle, and when said hook-up member is held in a fixed position relative to a tow vehicle, said boom and trolley hydraulic cylinders are operable for raising and retaining said front wheels off the ground, and for preventing a rotation of said U-shaped frame relative to said boom.

6. A mobile crane as claimed in claim 5 wherein said rear wheels have roadworthy rubber tires mounted thereon.

7. A mobile crane as claimed in claim 5 wherein said hook-up member comprises a circular plate and a cylindrical pin protruding through said circular plate, said circular plate and said cylindrical pin being sized to mate with a fifth-wheel-type hitch.

8. A mobile crane as claimed in claim 5 wherein said hook-up member is a socket-type hook-up adapted to mate with a ball-type-bumper hitch.

9. A mobile crane as claimed in claim 5 wherein said mast is affixed to said rear-end member of said U-shaped frame.

10. A mobile crane as claimed in claim 9 wherein said hydraulic power supply system is also affixed to said rear-end member.

11. A mobile crane as claimed in claim 10 wherein said first hydraulic valve is affixed to said U-shaped frame near said mast.

12. A mobile crane as claimed in claim 5 wherein said boom comprises a tubular base portion on said near end thereof and an extensional portion being telescopically mounted in said tubular base portion and being extendible toward said far end.

13. A mobile crane as claimed in claim 12 wherein said boom comprises an extension hydraulic cylinder connected between said base portion and said extensional portion for forcefully extending and retracting said extensional portion relative to said base portion.

14. A mobile crane as claimed in claim 13 wherein said U-shaped frame comprises a platform mounted between said spaced-apart arms for selectively supporting said movable article.

15. In combination a pickup truck and a mobile crane hitched behind said pickup truck for travelling to and from an article hoisting site, said pickup truck having a hitch member, and said mobile crane comprising:
   a horizontally disposed U-shaped frame having a front end and a rear end;
   a pair of first wheels affixed to said front end and a pair of second wheels affixed to said rear end for supporting said rear end, said rear wheels having roadworthy rubber tires mounted thereon;
   a mast extending vertically from said frame, said mast having a boom support bracket affixed thereto and said boom support bracket having a first pivot having a horizontal axis of rotation and a second pivot having a vertical axis of rotation relative to said U-shaped frame;
   a boom mounted in said boom support bracket, said boom having a far end and a near end, said boom being cantilevered in said boom support bracket with said near end being movably connected to said first pivot;
   said boom comprising a tubular base portion on said near end and an extensional portion being telescopically mounted in said tubular base portion and being extendible toward said far end;
   a winch mounted on said near end of said boom with a cable thereof threaded inside said boom and out at said far end;

coupling means affixed to said far end of said boom, said coupling means comprising a pair of spaced-apart parallel plates disposed astride said cable and said far end, and each having a pair of holes there through and a downward alignment of said holes in each said pair of holes through the diameters thereof forming an obtuse angle with the longitudinal axis of said boom on said near end of said boom;

a tow bar connected to said pairs of holes in said coupling means, said tow bar having an orientation following said downward alignment; said tow bar having a hookup member mounted thereon and said hook-up member being connected to said hitch member of said pickup truck;

a first hydraulic cylinder connected between said boom support bracket and said base portion of said boom; said first hydraulic cylinder being a double-acting first hydraulic cylinder for forcefully raising said front end of said frame and said first wheels relative to said second wheels;

rigging means connected between said front end of said frame and said boom for retaining said first wheels in a raised position above a road surface, and for preventing a rotation of said U-shaped frame relative to said boom;

a second hydraulic cylinder connected between said tubular base portion and said extensional portion, said second hydraulic cylinder being a double-acting second hydraulic cylinder for forcefully positioning said crane at a more or less distant position behind said pickup truck;

an hydraulic power supply system mounted on said frame for supplying hydraulic power to said first and second hydraulic cylinders;

first and second hydraulic valves being connected to said hydraulic power supply system and respectively to said first and second hydraulic cylinders for controlling displacements of said first and second hydraulic cylinders;

whereby when said first wheels are held in said raised position and a positioning of said crane behind said pickup truck is effected, said crane is safely towed by said pickup truck.

16. The combination of a pickup truck and a mobile crane hitched behind said pickup truck as claimed in claim 15 wherein said hitch member is a ball-type hitch and said hook-up member is a socket-type hook-up mating with said ball-type hitch.

17. The combination as claimed in claim 15, wherein said rigging means are also connected to said cable, whereby said winch is usable for raising and retaining said wheels in said raised position.

18. The combination as claimed in claim 17, wherein said crane further comprises:

a trolley movably mounted to said tubular base portion and having a hook attached thereto;

said boom also comprising a trolley hydraulic cylinder connected to said tubular base portion and to said trolley for forcefully controlling a displacement of said trolley along said tubular base portion;

said spaced-apart arms each having a lug plate affixed thereto near said front end thereof;

said rigging means beg also connected between said lug plates and said hook such that said trolley is also usable for lifting and retaining said spaced-apart arms in said raised position.

19. The combination as claimed in claim 18 wherein said trolley comprises a box-like member enclosing said boom, and said trolley hydraulic cylinder is mounted on an upper surface of said boom.

20. The combination as claimed in claim 19 wherein said trolley comprises casters mounted inside said box-like member; said tubular base portion of said boom having rails mounted thereon and said casters being engaged on said rails.

* * * * *